US011283725B2

(12) United States Patent
Jin et al.

(10) Patent No.: US 11,283,725 B2
(45) Date of Patent: *Mar. 22, 2022

(54) EVENT CONTENT DELIVERY

(71) Applicant: Twitter, Inc., San Francisco, CA (US)

(72) Inventors: Jie Jin, San Francisco, CA (US); Dustin Norlander, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,490

(22) Filed: Oct. 12, 2020

(65) Prior Publication Data

US 2021/0029057 A1 Jan. 28, 2021

Related U.S. Application Data

(63) Continuation of application No. 16/120,138, filed on Aug. 31, 2018, now Pat. No. 10,805,236.

(51) Int. Cl.
*G06F 15/16* (2006.01)
*H04L 47/70* (2022.01)
(Continued)

(52) U.S. Cl.
CPC .............. *H04L 47/82* (2013.01); *G06F 9/542* (2013.01); *H04L 67/24* (2013.01)

(58) Field of Classification Search
CPC ......... G06F 9/542; H04L 47/82; H04L 67/02; H04L 67/24; H04L 67/26; H04L 67/303
(Continued)

(56) References Cited

U.S. PATENT DOCUMENTS 5,557,798 A * 9/1996 Skeen ................... G06F 3/0481
705/35
2003/0200548 A1* 10/2003 Baran ................ H04N 21/2365
725/90
(Continued)

FOREIGN PATENT DOCUMENTS

EP 0759591 8/1996
EP 1384138 4/2002
(Continued)

OTHER PUBLICATIONS

PCT International Preliminary Report on Patentability in International Application No. PCT/US2019/048932, dated Mar. 11, 2021, 13 pages.
(Continued)

*Primary Examiner* — Liang Che A Wang
(74) *Attorney, Agent, or Firm* — Fish & Richardson P.C.

(57) ABSTRACT

Methods, systems, and apparatus, including computer programs encoded on computer storage media, for delivering event content. One of the methods includes initiating, for one or more client devices, a subscription to a topic; receiving an event relevant to a topic; determining a number of channel servers that correspond to the topic, wherein each channel server is associated with one or more client devices; determining that the number of channel servers that correspond to the topic is greater than a threshold number of channel servers; writing the received event from the event processor to an event fan-out queue, in response to the determination that the number of channel servers that correspond to the topic is greater than the threshold number of channel servers; reading the received event from the event fan-out queue; and sending the received event to the one or more client devices associated with each respective channel server.

24 Claims, 3 Drawing Sheets

(51) Int. Cl.
*G06F 9/54* (2006.01)
*H04L 67/54* (2022.01)

(58) Field of Classification Search
USPC .................. 709/201, 217, 218, 219, 223
See application file for complete search history.

(56) References Cited

U.S. PATENT DOCUMENTS

| | | | |
|---|---|---|---|
| 2010/0180033 A1* | 7/2010 | Abdelal .................. | H04L 12/66 709/226 |
| 2011/0258268 A1* | 10/2011 | Banks .................... | G06Q 10/06 709/206 |
| 2012/0296974 A1* | 11/2012 | Tabe ...................... | G06Q 10/06 709/204 |
| 2013/0066979 A1* | 3/2013 | Vasters .................. | G06Q 10/10 709/206 |
| 2014/0297350 A1 | 10/2014 | Kidron et al. | |
| 2015/0347600 A1* | 12/2015 | Tabe ................... | G06F 16/9535 707/710 |
| 2016/0036896 A1* | 2/2016 | Spivey ................... | H04L 67/26 709/204 |
| 2016/0036910 A1 | 2/2016 | Spivey | |

FOREIGN PATENT DOCUMENTS

| | | |
|---|---|---|
| EP | 1615378 | 4/2005 |
| WO | WO2017/066804 | 4/2017 |

OTHER PUBLICATIONS

Esposito et al., "Reliable publish/subscribe middleware for time-sensitive internet-scale applications," Proceedings of the 3rd ACM International Conference on Distributed Event-Based Systems, DEBS 2009, Article 16, 11 pages.
Gündoğan et al., "HoPP: Robust and Resilient Publish-Subscribe for an Information-Centric Internet of Things," Conference Paper, Oct. 2018, 10 pages.
Sadoghi et al., "Towards highly parallel event processing through reconfigurable hardware," Proceedings of the Seventh International Workshop on Data Management on New Hardware, Jun. 2011, 6 pages.
PCT Invitation to Pay Additional Fees in International Appln. No. PCT/US2019/048932, dated Nov. 27, 2019.
PCT International Search Report and Written Opinion in International Application No. PCT/US2019/048932, dated Jan. 28, 2020, 20 pages.

* cited by examiner

EVENT CONTENT DELIVERY

CROSS-REFERENCE TO RELATED APPLICATIONS

This application is a continuation application of, and claims priority to, U.S. patent application Ser. No. 16/120,138, for EVENT CONTENT DELIVERY, filed on Aug. 31, 2018. The disclosure of the foregoing application is incorporated here by reference.

BACKGROUND

This specification relates to providing event content to one or more user devices. A conventional request-response model includes a first computing device sending a request for information to a second computing device, then receiving a response to the request from the second computing device.

By contrast, in a conventional topic-based publish-subscribe model, users of computing devices can subscribe to a particular topic. Content published for the topic is provided to all users that are subscribed to the topic. For example, the subscription can be hosted by a server that is configured to send messages identified as associated with the topic to each computing device that is subscribed to the topic. Once subscribed to the topic, the computing device typically receives ongoing subscription content without performing individual requests to the server.

SUMMARY

This specification describes technologies for subscribing to a topic and receiving content related to the topic.

These technologies generally relate to a system that receives subscription requests from users. Each subscription request identifies a topic that the user wants to receive information about. In response to the subscription request, the system initiates a subscription session to the topic that is hosted by a channel server of the system. The subscription session is unique to the client that the user used to make the subscription request. The channel server sends particularly defined information related to the topic, called an event, to the client.

When an event is received for the topic, event information is added to one or more event queues corresponding to channel servers hosting subscriptions to the topic. If the system determines that the number of channel servers hosting subscriptions to the same topic is above a threshold, a fan-out queue is used to limit excessive writing of event information to individual event queues. In particular, events written to the fan-out queue can be provided to all of the channel servers hosting subscriptions on the topic. For example, channel servers can periodically read from the fan-out queue to obtain events.

In general, one innovative aspect of the subject matter described in this specification can be embodied in methods that include the actions of initiating, for each of one or more client devices, a subscription to a topic; receiving, on an event processor, an event relevant to the topic; determining how many channel servers are handling the topic, wherein each channel server handles topics subscribed to by one or more client devices; determining that the number of channel servers that are handling the topic is greater than a threshold number of channel servers; writing the received event from the event processor to an event fan-out queue, in response to the determination that the number of channel servers that correspond to the topic is greater than the threshold number of channel servers; reading, by the channel servers, the received event from the event fan-out queue; and sending the received event from each respective channel server that is handling the topic to the one or more client devices subscribed to the topic.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Initiating, for each of the one or more client devices, a subscription to a topic includes: receiving, from each of the one or more client devices, one or more subscription requests from the one or more client devices, wherein the one or more subscription requests include the topic; and initiating one or more subscriptions to the topic for the one or more client devices in response to the one or more received subscription requests, including, for each initiated subscription, adding a session identifiers associated with the client device to a mapping of session identifiers to topics.

Initiating a subscription includes sending a configuration packet to the client device, wherein the configuration packet includes one or more subscription timers unique to the client device. The one or more subscription timers indicate that the user associated with the client device is idle, and wherein being idle can include the user not interacting with their client device for more than a threshold amount of time. Sending the received event from the determined number of channel servers to the one or more client devices associated with each respective channel server further includes: determining that the one or more client devices is not idle; and sending the received event from the determined number of channel servers to the one or more client devices associated with each respective channel server. The method further includes determining that one or more client devices is idle; and dissociating one or more channel servers from the one or more idle client devices. The method further includes determining that the one or more client devices are no longer idle; and reassociating the one or more channel servers with the one or more client devices. The one or more subscription requests are requests to receive one or more engagements related to a broadcast, the one or more engagements including likes and rebroadcasts, and wherein the topic can include information related to the broadcast. The one or more subscription requests are requests to receive one or more engagements related to a conversation with one or more participants, the engagements including an indication that one or more of the participants is constructing a message, and wherein the topic can include information related to the conversation.

The subject matter described in this specification can be implemented in particular embodiments so as to realize one or more of the following advantages.

The disclosed systems and methods allow a client to receive relevant data without the need for the client's device to send multiple requests for the data, as is required, for example, by a request-response model. Therefore, the subject matter features a reduction in computing resources and network usage relative to a system that uses a request-response model.

The systems and methods allow for efficient distribution of events by using an event fan-out queue under specified criteria to limit redundancy of writing events about a particular subscribed topic to many individual queues. Using a single event fan-out queue for events associated with a large number of channel servers reduces the number of write operations to individual channel server event queues by allowing an event processor to write to a single event fan-out queue. Accordingly, an event can fan-out to a large number of channel servers each of which can send the event to a large number of hosted clients. As a result, the event can be delivered to, for example, millions of subscribed clients concurrently. To avoid maintaining the subscription of a user that is determining to be inactive, the system can impose a time to live (TTL) for each subscription. This allows the system to end the subscriptions of users that are determined to be inactive conserving computing resources for active users.

BRIEF DESCRIPTION OF THE DRAWINGS

Like reference numbers and designations in the various drawings indicate like elements.

DETAILED DESCRIPTION

Network activity for many mobile devices is based on the request-response model. However, particular types of activity is not well served by the request-response model. For example, a messaging platform can include an alert provided to client devices indicating that another user is typing a message, e.g., as part of a conversation between a first user and a second user. However, when using the request-response model, the first user's computing device would have to continuously send requests to the messaging platform to "ask" it whether the second user is typing. In turn, the messaging platform would also have to send a response for every request received.

Continuously sending requests and responses, can require a significant amount of computation by a computing device's CPU. Because of this, a user could experience a reduction in battery life, an increase in data usage, and a decrease in the speed of the computing device.

Some of these effects can be mitigated using a publish-subscribe model. However, for a messaging system scaling event dissemination for a large volume of events and subscribers can introduce other challenges.

This specification describes techniques for providing information about particular events in a timely manner without the shortcomings of the request-response and conventional publish-subscribe models.

Figure 1:
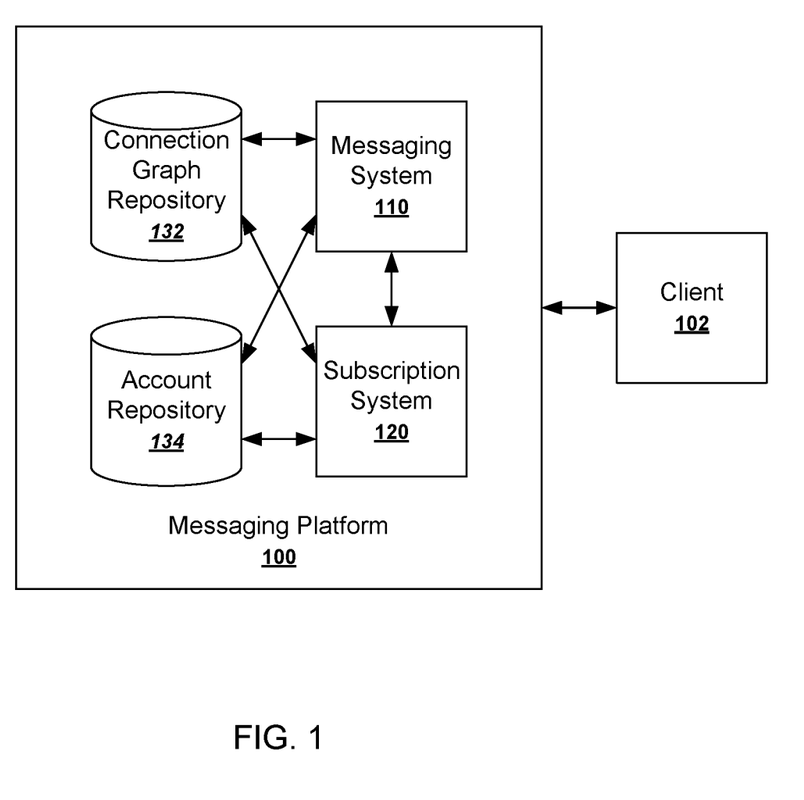
FIG. 1 is a block diagram of an example messaging platform communicatively coupled with a client.

FIG. 1 is a block diagram of an example messaging platform 100 communicatively coupled with many client devices, e.g., a client device 102. The messaging platform includes a messaging system 110, a subscription system 120, a connection graph repository 132, and an account repository 134.

The messaging platform 100 can store millions of accounts of individuals, businesses, and/or other entities, e.g., pseudonym accounts, novelty accounts, and so on, e.g., using the account repository 134.

Clients may use the messaging platform to send messages to other accounts inside and/or outside of the messaging platform. In some implementations, the messaging platform can be configured to enable clients to communicate in "real-time", i.e., to converse with other clients with a minimal delay and to conduct a conversation with one or more other clients during simultaneous sessions.

The messaging system can allow a client to broadcast messages. The client can also display messages broadcast by the messaging system within a time frame short enough to provide a real-time interaction between users of the messaging system. Recipients of a message may have a predefined relationship with an account of the client broadcasting the message. The predefined relationship can be represented in the connection graph repository 132.

The subscription system 120 is configured to receive a subscription request from a client. The subscription request identifies a topic. In response to the subscription request, the subscription system subscribes the client to the topic. The subscription system sends information to the subscribed client without requiring the client to continuously send requests for information relevant to the topic.

A client can initiate a subscription by first sending an events request to the subscription system. The events request can be an HTTP GET request that establishes a network connection between the client's device and the subscription system. In response to the events request, a channel server of the subscription system can send a configuration packet to the client. The configuration packet can include a session identifier (ID), which is a unique identifier for the user. After a establishing the network connection and receiving the configuration packet, the client can send a subscription request to the subscription system. The subscription request can be an HTTP POST request that includes the client's session ID and a topic corresponding to what the client wants to be subscribed to. The subscription system then initiates a subscription session for the client to the topic specified by the subscription request. Once the client is subscribed to the topic, the subscription system can send events related to the topic to the client. For example, the subscription can use the network connection established by the events request to send events related to the topic to the subscribing client devices.

Figure 2:
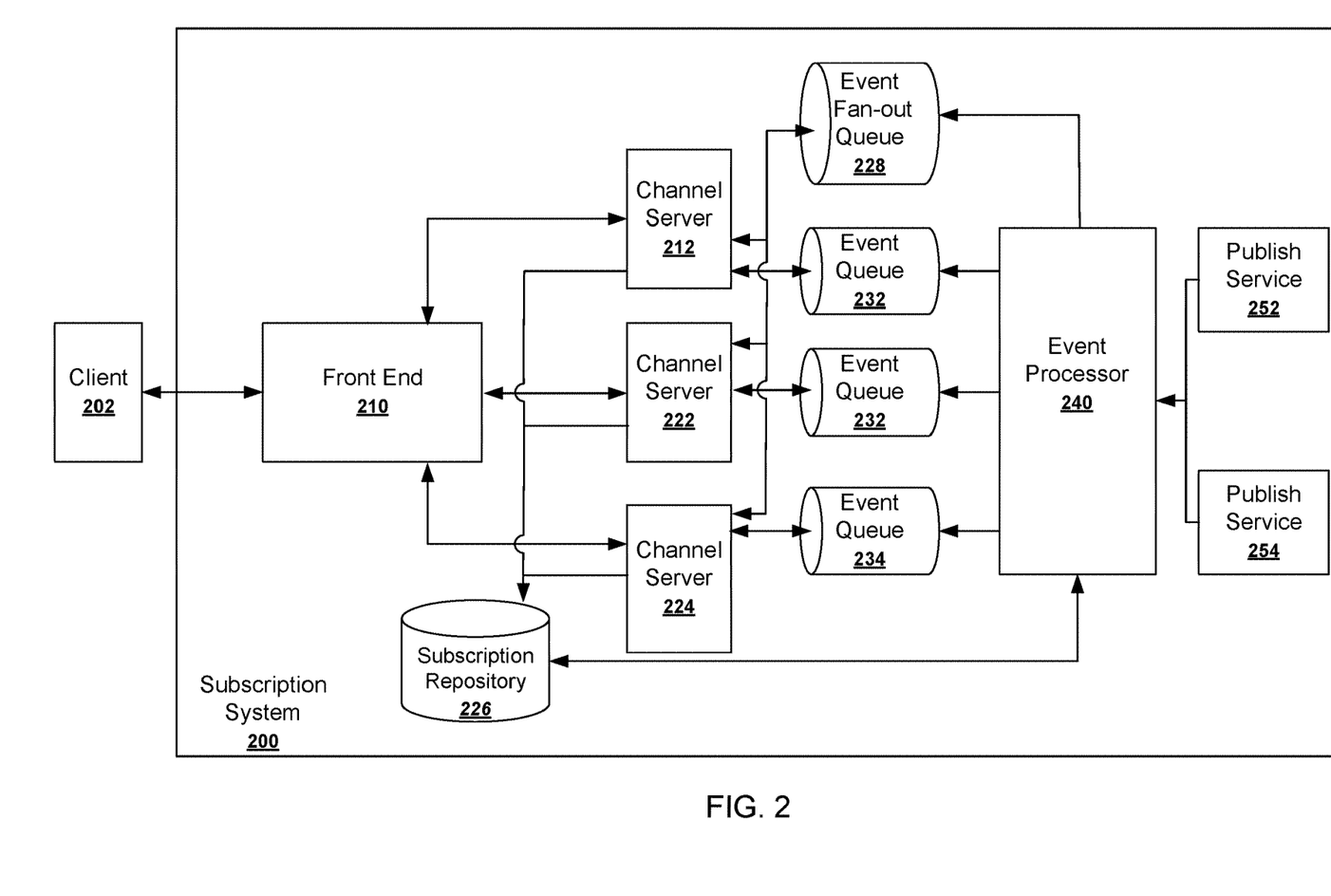
FIG. 2 is a block diagram of an example subscription module communicatively coupled with the client.

FIG. 2 is a block diagram of an example subscription system 200 communicatively coupled with a client 202. The client 202 is a representative client. Many different client devices can be communicatively coupled with the subscription system 200.

The subscription system 200 includes a front end 210, channel servers 212, 222, and 224, a subscription repository 226, event queues 232, 233, and 234, a fan-out queue 228, an event processor 240, a queueing engine 245, and publish services 252 and 254. The connections between components of the subscription system can be network connections, e.g., a local area network (LAN), the Internet, and so on.

The front end 210 represents an endpoint of the subscription system 200 that is configured to receive communications from the client 202, for example subscription requests, and to send events to the client 202. In some implementations, the front end 210 includes both an edge server and one or more routing engines. The edge server provides a gateway to the subscription system from an outside network. The edge server is configured to receive HTTP traffic from the client and send events to the client. The HTTP traffic can include a subscription request. The subscription request can be sent to one of the one or more routing engines, which route the subscription request to a particular channel server. The particular channel server can be selected using any suitable technique, for example, a round-robin technique can be used to distribute received subscription requests to individual channel servers. The channel server that receives the events request hosts a subscription session for the client that sent the events request.

The subscription system 200 is shown as including three channel servers although, in other implementations, the subscription module can include many more channel servers, e.g., several hundred channel servers, for a messaging platform. Each channel server 212, 222, and 224 is associated with a unique channel server identifier (ID). Each channel server ID can be used to identify a specific event queue of the channel server.

Subscription Path

In response to receiving a subscription request, a particular channel server can send the client a configuration packet through the front end 210. The configuration packet includes a session identifier (ID), which is a unique identifier for the client subscription. Also included in the configuration packet is a subscription timer for the subscribed topic. The subscription timer can indicate a subscription's time to live, or TTL, which corresponds to a time period after which a channel server will unsubscribe a subscribed client from a topic if the channel server determines that the client was inactive for the TTL.

As part of the subscription process, the client can respond to the configuration packet with a specific topic to subscribe the client to. In some implementations, the response is an HTTP POST request that includes the client's session ID and a topic. For example, the topic can be a particular message or conversation of the messaging platform. The topic can be identified by a particular identifier, for example, a message or conversation identifier used by the messaging platform. The topic can be a message where events associated with the topic include any interaction, e.g., engagement activity, with the message. As another example, the topic can be more specific for a conversation, e.g., typing with respect to an identified conversation where events for the topic include notification that a user is typing.

The channel server that receives the subscription request establishes the subscription including adding the session ID to a local mapping that relates session IDs to subscription topics. Thus, each channel server has a mapping that identifies the client session for each topic hosted by the channel server. As a result, upon receiving particular event information for a topic hosted by the channel server, the channel server can use the mapping to identify each subscribed client to provide the event based on the mapping of topics to session identifiers.

Establishing the subscription session also includes associating the channel server with the topic in a map that is stored in the subscription repository 226. Specifically, the subscription repository 226 includes a mapping of topics to channel servers so that for each topic, the one or more channel servers hosting client subscriptions to that topic can be identified.

In some cases, a channel server receives a subscription request to a topic that the channel server is already handling. For example, the channel server can already be hosting a subscription session for the topic for one or more other client session IDs. In such cases the channel server ID is already stored in the mapping of topics to channel server IDs in the subscription repository 226. Consequently, the channel server does not add its channel server ID to the mapping, to avoid redundant entries in the map.

Each client subscription to a topic lasts for a pre-determined amount of time, called the TTL. The TTL can also be thought of as a period of time in which the channel server will maintain a client's session ID in the local mapping of topics to session IDs. When a channel server initiates a subscription to a topic, it sets the subscription timer associated with the subscription to the amount of time specified by the TTL. If the subscription timer expires, the channel server hosting the client will unsubscribe the client from the topic by removing the client's session ID from the local mapping of topics to session IDs. One advantage of maintaining a subscription timer is that it allows the subscription system to end the subscriptions of clients that are idle or unresponsive. Suitable values for the TTL are two minutes, five minutes. Furthermore, if no other session IDs of the channel server are subscribed to the topic, the channel server ID can be removed from the subscription repository mapping.

In this implementation, a subscribed client must send a new subscription request for the topic to the subscription system prior to the expiration of the TTL in order to maintain an uninterrupted subscription. In response to receiving a new subscription request, a channel server can reset the subscription timer associated with the client's subscription to the TTL, i.e., reallot the amount of time corresponding to the TTL to the subscription timer.

The subscription system can also limit the number of subscriptions a client can have at once. In some implementations, the subscription system limits each client to A maximum number of subscriptions, e.g., 10 or 25 subscriptions.

Event delivery path Different services of the messaging platform, e.g., messaging platform 100, can publish events to the subscription system 200. For example, the publish services 252, 254 can provide an application programming interface (API) that allows other services of the messaging platform to publish events, e.g., using a Thrift API. The publish services can also perform processing on the events prior to providing them to the event processor 240, for example, validation or rate limiting of events. In this example, the subscription system 200 includes two publish services 252 and 254, although, in other implementations, the subscription module can include greater or fewer publish services depending on the specific requirements of the subscription system 200.

The publish services 252, 254 pass events to the event processor 240. The event processor 240 routes each event to corresponding channel servers housing subscriptions to the topic of the event.

The event processor 240 sends events to event queues 230, 232, 234. In this implementation, the subscription system includes a single event processor 240 although, in other implementations, the subscription module can include multiple events processors. Each event is associated with a topic. Event content can include an identifier that corresponds to one or more topics. For example, an event indicating that an engagement counter has been incremented for a message will identify that message using the corresponding message identifier. The topic subscribed to can also be the message identifier. Therefore, the event content can be used to determine which topic the event is associated with.

The event processor 240 uses the mapping of channel servers IDs to topics in the subscription repository 226 to determine which channel servers are handling a given topic. Using the mapping, the event processor 240 determines one or more channel servers to receive the event. The event processor can then send the event to one or more event queues that correspond to the channel servers handling the topic. In particular, each channel server 212, 222, 224 is associated with a corresponding event queue 230, 232, 234. In some implementations, the event processor 240 sends a look up request for the topic to the subscription repository 226. The subscription repository 226 then returns a set of channel server ID that are handling the topic.

For example, a given event can be associated with Topic 1. Using the mapping in the subscription repository 226, the event processor 240 can determine that Topic 1 is handled by channel servers 212 and 224. Consequently, the event is sent to event queues 230 and 234, corresponding to channel servers 212 and 224, respectively.

The channel servers 212, 222, 224 receive events from the event processor 240 through their respective event queues. In some implementations, each channel server 212, 222, 224 periodically reads events from a corresponding event queue 230, 232, 234. For example, the channel servers can each read from their respective event queues every 50 ms. In some other implementations, the event processor 240 uses the event queues to push events to the corresponding channel servers, for example, based on a periodic time interval, based on when events are added to the queue, or based on a volume of pending events in the queue.

After a channel servers receives an event from an event queue, the channel server can query its local mapping of topics to session IDs of clients that the channel server has an open connection to in order to determine which clients are subscribed to the topic of the received event and sends the event to those clients.

Thus, events are fanned out by the event processor to channel servers hosting the topic of the event. Each channel server then fans out the event to clients that are subscribed to the topic.

Fan-Out Queue

As described above, the event processor 240 sends the event to respective event queues for each channel server handling subscribers to the topic of the event. However, in some situations this can mean writing the event to many individual event queues. To avoid the inefficiency resulting from many redundant writes to individual queues, the event processor first determines how many channel servers are handling subscriptions to the topic of the event. In response to a determination that the number of channel servers exceeds a specified threshold number, the event processor 240 instead sends the event to event fan-out queue 228 and not to the individual channel server queues. In some implementations, the event fan-out queue 228 is generated dynamically as needed to route events to channel servers.

The event fan-out queue 228 can provide events to multiple channel servers. In some implementations, each channel server periodically reads from the fan-out queue 228. In some other implementations, the fan-out queue 228 periodically pushes events to the channel servers. The threshold number of channel servers can be any suitable number greater than zero and less than, or equal to, the total number of channel servers included in a given subscription module. For example, if there are 1000 channel servers, an event fan-out queue 228 can be used when the number of channel servers handling a subscription topic exceed half the total number of channel servers. The particular threshold number can be determined based on various criteria and can in some cases be determined empirically based on resource usage of the event processor, volume of events, number of channel servers, etc.

Failure Behavior

In some cases, a client's device can lose network connectivity. If the client has established a connection to a channel server, the subscription system can detect a client network loss in multiple ways.

As a first example, if the channel server sends an event to the front end 210, the front end 210 will attempt to send the event to the client 202. If the client 202 has lost network connectivity then the front end 210 can detect that there is no network connection through which to send the event. Following this detection, the front end 210 can communicate the loss of network connection to the channel server hosting the client 202. The channel server can then unsubscribe the client, which can include removing the client's session ID from the map that relates a topic to a session ID of a client subscribed to the topic.

As a second example, the TTL associated with the client's subscription can indicate that a client has lost network connectivity. After the TTL has expired, the subscription system will automatically unsubscribe the client.

Figure 3:
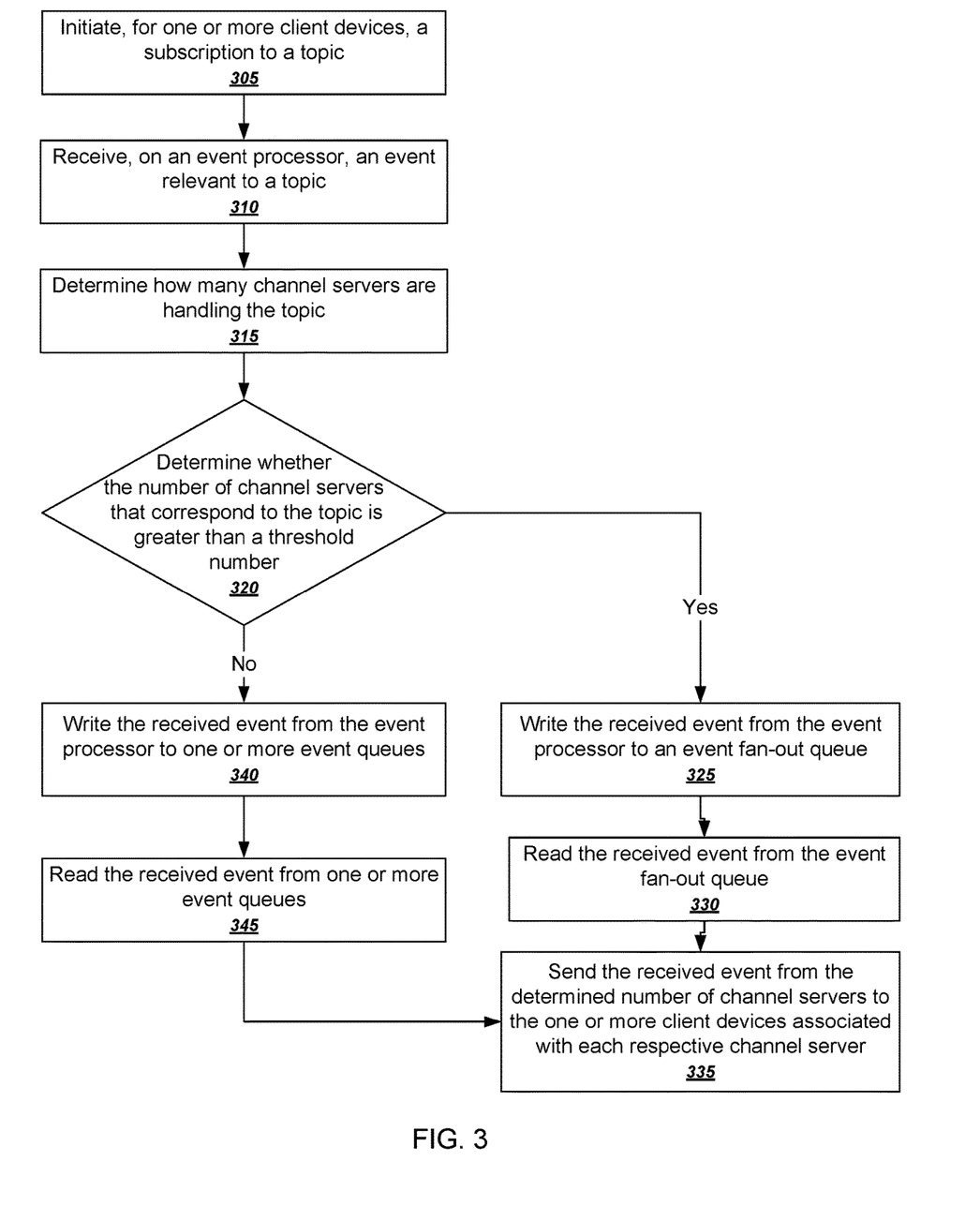
FIG. 3 is a flowchart of an example process for sending an event to a client subscribed to the subscription module.

FIG. 3 is a flowchart of an example process 300 for sending an event to a client subscribed to a subscription module. For convenience, the process will be described as being performed by a system of one or more computers, located in one or more locations, and programmed appropriately in accordance with this specification. For example the subscription system 200, when properly programmed, can perform the example process.

The system initiates, for one or more client devices, a subscription to a topic (305). More specifically, the system receives an events request to establish communication with the system. In response to each events request, a channel server of the system sends a configuration packet to the corresponding client device that includes a session identifier. In response, the client sends a subscription request that identifies a topic that the user wishes to subscribe. In response to the subscription request, the channel server initiates a subscription to the topic for the client device including associating the session ID for the client subscription with the topic in a subscription repository that maps topics to session IDs of client device subscribers.

The system receives, on an event processor, events that are generally relevant to a respective topic (310). The event processor can receive the event from a publish service that receives events from one or more sources, including clients of the system.

The system determines how many channel servers are handling a particular topic (315). The event processor determines the topic or topics to which each event it receives is related. The event processor can also determine which channel servers are handling the topic, for example, by accessing a mapping that relates topics to channel servers handling the topics.

The system determines whether the number of channel servers that correspond to the topic is greater than a threshold number of channel servers (320).

In response to determining that the number of channel servers is greater than the threshold number, the system sends, e.g., writes, the received event from the event processor to an event fan-out queue (325, i.e. the "YES"

branch). In some implementations, the system dynamically generates the event fan-out queue in response to the determination. The event fan-out queue communicatively couples the event processor to the channel servers that are handling the topic.

The respective channel servers read the received event from the event fan-out queue (330). In particular, each channel server obtains the events in the event fan-out queue for topics handled by the channel server.

The system, at each channel server, determines which client devices are subscribed to the topic of the received event and sends the event to those client device (335). The client devices subscribed to the topic of the event are identified using a mapping that relates topics to session IDs of client devices that are subscribed to the topic. Each channel server hosting a client that is subscribed to the topic sends the received event to the hosted client.

In response to determining that the number of channel servers is not greater than the threshold number, the system sends, e.g., writes, the received event from the event processor to one or more event queues (440, i.e. the "NO" branch). Each of the event queues corresponds to one of the channel servers handling a subscription to the topic relevant to the event. The event processor can determine the appropriate event queues to send the event to using a mapping that relates topics to channel server IDs of channel servers that are handling the topics. Additionally, each event queue is associated with a corresponding channel server ID.

The respective channel servers read the received event from the corresponding event queues (345). After reading from the one or more event queues, each channel server can determine the topic to which the event corresponds, e.g., using an identifier included in the event that identifies the corresponding topic.

Following stage 345, the "NO" branch can continue by performing stage 335 described above.

As an example, a user may want to subscribe to content such as a particular message broadcast on the messaging platform. The subscription can represent the user's desire to receive updates concerning one or more engagements related to the message, e.g., an updated count of message "likes." The topic of the subscription can include information identifying the message. The one or more engagements can be indications that one or more other users have interacted with the message, e.g., by incrementing an engagement count for a particular engagement type. For example, the one or more engagements can indicate that one or more other users have liked or rebroadcasted the message. The device or devices of the one or more other users can notify the message system of the one or more engagements. The messaging system can communicate this information to the subscription system, which, in response, can send the engagement as an event to the subscribed user's device. The user can therefore view the incremental indications of engagements in real-time. A user that is subscribed to a topic continues to receive events from the subscription system until the user elects to unsubscribe from the topic. The client can unsubscribe from a topic by sending an unsubscribe request to the subscription module. For example, the unsubscribe request can be an HTTP POST request. The HTTP POST request can include the client's session ID and the topic that the user wants to unsubscribe to. The edge server can send the unsubscribe request to one of the routing engines, which can then send it to the channel server that is hosting the client's subscription to the topic. In response to the unsubscription request, the channel server handling the topic can unsubscribe the client, i.e., end the client's subscription session.

Unsubscribing the client includes dissociating the client's session ID from the topic the client was subscribed to. In other words, the channel server deletes the client's session ID from the local mapping of topics to session IDs. If the channel server is not hosting another client session for the topic, then the subscription repository dissociates the channel server ID from the topic in the local mapping from topics to channel server IDs handling the topics.

In addition to manually unsubscribing from a topic, a client can also be automatically unsubscribed from a topic by the subscription system. If the user is determined to be idle for more than a threshold amount of time, for example, the TTL of the client's subscription session, then the subscription system can automatically end the client's subscription session. For example, a client can subscribe to a broadcast using a computing device. The subscription system can detect if the computing device enters a sleep mode, and determine that the user is idle. If the computing device remains in the sleep mode for more than a threshold amount of time, then the subscription module can end the computing device's subscription to the broadcast.

In some embodiments, in response to detecting that a user has been idle for the threshold amount of time, the subscription system can send an unsubscribe notification to the client to indicate that the subscription system will end the client's subscription after a certain timespan. For example, a user can subscribe to a topic using a computing device. The subscription system can determine that the user has not interacted with the computing device for the threshold amount of time. The subscription module can then send an unsubscribe notification to the computing device. The unsubscribe notification can include a timespan in which the user must interact with the computing device in order to avoid being unsubscribed from the topic.

The client ensures that a user's subscription remains active as long as the user is not idle. That is, so long as the user is not idle, the client can issue resubscription requests to the subscription system. Therefore, the subscription system does not require that a non-idle user continuously re-subscribe to maintain a subscription A user's subscriptions can also be based on what the user is currently viewing on a computing device connected to the subscription system. For example, a user can subscribe to a post that is currently being displayed by the user's device. If the post is no longer visible on the device (e.g., if the user navigates away from the post) then the subscription module can automatically unsubscribe the user from the post.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is disclosed or on the scope of what is being or may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving, at an event processor, an event relevant to a topic;
   determining, from among a collection of channel servers, a plurality of channel servers that are handling the topic, wherein each channel server handles one or more topics subscribed to by one or more client devices;
   determining, using a number of the plurality of channel servers handling the topic, whether to distribute the received event using an event fan-out queue; and
   in response to determining to distribute the received event using the event fan-out queue:
     writing the received event from the event processor to the event fan-out queue, wherein the event fan-out queue is accessible by the plurality of channel servers;
     reading, by each of the plurality of channel servers, the received event from the event fan-out queue; and
     for each of the plurality of channel servers, sending the received event from the channel server to one or more particular client devices subscribed to the topic.

2. The method of claim 1, further comprising initiating, for each of the one or more client devices, a subscription to the topic.

3. The method of claim 2, wherein initiating, for each of the one or more client devices, the subscription to the topic comprises:
   receiving, from each of the one or more client devices, one or more subscription requests, wherein the one or more subscription requests include the topic; and
   initiating one or more subscriptions to the topic for the one or more client devices in response to the one or more received subscription requests, including, for each initiated subscription, adding a session identifier associated with the client device to a mapping of session identifiers to topics.

4. The method of claim 3, wherein initiating the subscription includes sending a configuration packet to the client device, wherein the configuration packet includes one or more subscription timers unique to the client device.

5. The method of claim 4, wherein the one or more subscription timers indicate that a user associated with the client device is idle, and wherein being idle can include the user not interacting with their client device for more than a threshold amount of time.

6. The method of claim 1, wherein sending the received event from the plurality of channel servers to the one or more particular client devices associated with each respective channel server comprises:
   determining that the one or more particular client devices are not idle; and
   sending the received event from the channel server to the one or more particular client devices associated with the channel server.

7. The method of claim 1, further comprising:
   determining that one or more first client devices are idle; and
   dissociating one or more channel servers from the one or more idle first client devices.

8. The method of claim 7, further comprising:
   determining that the one or more first client devices are no longer idle; and
   reassociating the one or more channel servers with the one or more first client devices.

9. A system comprising:
   a plurality of channel servers each configured to send events relevant to a topic to one or more client devices subscribed to the topic;
   an event fan-out queue configured to communicate an event relevant to the topic to each of the plurality of channel servers; and
   an event processor configured to route the event to the event fan-out queue, wherein the event processor is configured to perform operations in response to receiving an event relevant to the topic comprising:
     determining, using a number of the plurality of channel servers, whether to distribute the event using the event fan-out queue; and
     in response to determining to distribute the received event using the event fan-out queue:
       writing the received event from the event processor to the event fan-out queue, wherein the event fan-out queue is accessible by the plurality of channel servers;
       reading, by each of the plurality of channel servers, the received event from the event fan-out queue; and
       for each of the plurality of channel servers, sending the received event from the channel server to one or more particular client devices subscribed to the topic.

10. The system of claim 9, further comprising an edge server that is configured to initiate, for each of the one or more client devices, a subscription to the topic.

11. The system of claim 10, wherein initiating, for each of the one or more client devices, the subscription to the topic comprises:
    receiving, from each of the one or more client devices, one or more subscription requests, wherein the one or more subscription requests include the topic; and
    initiating one or more subscriptions to the topic for the one or more client devices in response to the one or more received subscription requests, including, for each initiated subscription, adding a session identifier associated with the client device to a mapping of session identifiers to topics.

12. The system of claim 11, wherein initiating the subscription includes sending a configuration packet to the client device, wherein the configuration packet includes one or more subscription timers unique to the client device.

13. The system of claim 12, wherein the one or more subscription timers indicate that a user associated with the client device is idle, and wherein being idle can include the user not interacting with their client device for more than a threshold amount of time.

14. The system of claim 9, wherein sending the received event from the plurality of channel servers to the one or more particular client devices associated with each respective channel server comprises:
 determining that the one or more particular client devices are not idle; and
 sending the received event from the channel servers to the one or more particular client devices associated with the channel server.

15. The system of claim 9, wherein the channel servers are each further configured to perform operations comprising:
 determining that one or more first client devices are idle; and
 dissociating from the one or more idle first client devices.

16. The system of claim 15, wherein the channel servers are each further configured to perform operations comprising:
 determining that the one or more first client devices are no longer idle; and
 reassociating with the one or more first client devices.

17. One or more computer storage media encoded with instructions that, when executed by one or more computers, cause the one or more computers to perform operations comprising:
 receiving, at an event processor, an event relevant to a topic;
 determining, from among a collection of channel servers, a plurality of channel servers that are handling the topic, wherein each channel server handles one or more topics subscribed to by one or more client devices;
 determining, using a number of the plurality of channel servers handling the topic, whether to distribute the received event using an event fan-out queue; and
 in response to determining to distribute the received event using the event fan-out queue:
  writing the received event from the event processor to the event fan-out queue, wherein the event fan-out queue is accessible by the plurality of channel servers;
  reading, by each of the plurality of channel servers, the received event from the event fan-out queue; and
  for each of the plurality of channel servers, sending the received event from the channel server to one or more particular client devices subscribed to the topic.

18. The computer storage media of claim 17, wherein the operations further comprise initiating, for each of the one or more client devices, a subscription to the topic.

19. The computer storage media of claim 18, wherein initiating, for each of the one or more client devices, the subscription to the topic comprises:
 receiving, from each of the one or more client devices, one or more subscription requests, wherein the one or more subscription requests include the topic; and
 initiating one or more subscriptions to the topic for the one or more client devices in response to the one or more received subscription requests, including, for each initiated subscription, adding a session identifiers associated with the client device to a mapping of session identifiers to topics.

20. The computer storage media of claim 19, wherein initiating the subscription includes sending a configuration packet to the client device, wherein the configuration packet includes one or more subscription timers unique to the client device.

21. The computer storage media of claim 20, wherein the one or more subscription timers indicate that a user associated with the client device is idle, and wherein being idle can include the user not interacting with their client device for more than a threshold amount of time.

22. The computer storage media of claim 17, wherein sending the received event from the plurality of channel servers to the one or more particular client devices associated with each respective channel server comprises:
 determining that the one or more particular client devices are not idle; and
 sending the received event from the channel server to the one or more particular client devices associated with the channel server.

23. The computer storage media of claim 17, wherein the operations further comprise:
 determining that one or more first client devices are idle; and
 dissociating one or more channel servers from the one or more idle first client devices.

24. The computer storage media of claim 23, wherein the operations further comprise:
 determining that the one or more first client devices are no longer idle; and
 reassociating the one or more channel servers with the one or more first client devices.

* * * * *

UNITED STATES PATENT AND TRADEMARK OFFICE
CERTIFICATE OF CORRECTION

| | |
|---|---|
| PATENT NO. | : 11,283,725 B2 |
| APPLICATION NO. | : 17/068490 |
| DATED | : March 22, 2022 |
| INVENTOR(S) | : Jie Jin and Dustin Norlander |

It is certified that error appears in the above-identified patent and that said Letters Patent is hereby corrected as shown below:

In the Claims

Column 15, Line 15, Claim 14, delete "servers" and insert -- server --.

Column 16, Line 16, Claim 19, delete "identifiers" and insert -- identifier --.

Signed and Sealed this
Seventeenth Day of May, 2022

Katherine Kelly Vidal
*Director of the United States Patent and Trademark Office*